United States Patent [19]
Riffee

[11] Patent Number: 5,675,375
[45] Date of Patent: Oct. 7, 1997

[54] HOME VIDEOCONFERENCING SYSTEM (HVS)

[75] Inventor: Robert Keith Riffee, Melbourne, Fla.

[73] Assignee: Harris Corporation, Melbourne, Fla.

[21] Appl. No.: 356,683

[22] Filed: Dec. 15, 1994

[51] Int. Cl.⁶ ..................................................... H04M 11/00
[52] U.S. Cl. ................................. 348/15; 379/96; 379/202
[58] Field of Search ................ 348/14–19; 379/201–205, 379/96–98, 93; 382/41, 56

[56] References Cited

U.S. PATENT DOCUMENTS

| | | | |
|---|---|---|---|
| 5,280,540 | 1/1994 | Addeo et al. | 348/15 |
| 5,343,240 | 8/1994 | Yu | 348/14 |
| 5,347,305 | 9/1994 | Bush et al. | 348/14 |
| 5,373,316 | 12/1994 | Ishinabe et al. | 348/15 |
| 5,379,351 | 1/1995 | Fandrianto et al. | 382/41 |
| 5,438,357 | 8/1995 | McNelley | 348/15 |
| 5,444,477 | 8/1995 | Yamadera et al. | 348/15 |
| 5,453,780 | 9/1995 | Chen et al. | 348/15 |
| 5,541,982 | 7/1996 | Bergler | 379/93 |

OTHER PUBLICATIONS

Junko Yoshida, "Japanese Tout POTS Videophones—Again", *EE Times*, pp. 1 & 119, Sep. 19, 1994.

MCI's VideoPhone Advertisement, Undated and Source Unknown.

PictureTel System 4000 and Model 200 Advertisement, Undated and Source Unknown.

*Primary Examiner*—Wing F. Chan
*Attorney, Agent, or Firm*—Jaeckle Fleischmann & Mugel, LLP

[57] ABSTRACT

A home videoconferencing system 100 uses a standard television receiver 16 and a camcorder 14. The video controller 112 converts an outgoing analog video signal into a compressed digital video signal; an audio controller 116 converts an outgoing analog audio signal into a compressed digital audio signal. The system controller 120 multiplexes, synchronizes and error corrects outgoing and incoming digital system signals. The digital system signals are coupled to a modem 122 for transmission and reception over analog phone lines 124.

24 Claims, 9 Drawing Sheets

HOME VIDEOCONFERENCING SYSTEM (HVS)

This invention relates in general to videoconferencing and, in particular, to a home videoconferencing system (HVS).

BACKGROUND

Videoconferencing is the two-way, synchronized transfer of video and audio information across a communication link, usually digital or analog phone lines. Until now videoconferencing has been very expensive and can be afforded on a regular basis only by organizations with significant financial resources. For example, large corporations use videoconferencing to reduce travel costs by holding executive meetings by videophone instead of face-to-face. However, such videoconferencing systems are large, expensive, and require multiple phone lines as well as specially designed meeting rooms and specially trained operators. The cost associated with videoconferencing is often beyond the financial resources of small companies and individuals.

Over the last ten years the cost of videoconferencing has dropped dramatically due to the introduction of faster, smaller, and more powerful microprocessor and peripheral supporting hardware. The three largest US manufacturers of videoconferencing equipment, PictureTel, Compression Labs, Inc. (CLI), and VideoTelecom, have enjoyed great success in providing many medium and large sized businesses with video systems. The cost of a starter business system has dropped to about $15,000 and no special room or lighting is required. Only two digital telephone lines are needed to provide adequate video and audio quality.

In order to transmit video and audio data, analog video and analog audio signals are converted to binary data signals by an analog to digital converter. To increase the speed of the transmission of the binary signals, a processor compresses the data in accordance with a compression program or algorithm. As used hereinafter, the term algorithm refers to a computer program that operates on a stream of data. Although some manufacturers use a proprietary video/audio compression/decompression algorithm, almost all business systems now have the option to use an internationally accepted standard video/audio compression/decompression algorithm. This standard renders the hardware made by different vendors compatible with each other. Accordingly, more businesses are purchasing videoconferencing systems since compatibility is assured.

However, individual homeowners have not been able to participate in videoconferencing until very recently. For typical consumers, available business systems are still expensive, bulky, complex, and require digital phone lines, all of which makes them unsuitable for home use over standard (analog) telephone lines. Over the past two years some manufacturers have announced videophones for the home that transmit video and audio over standard analog phone lines. These devices combine a telephone, mini-camera, and small LCD screen into a single chassis. Such videophones are capable of sending very low-resolution, low frame rate video images, along with audio, over telephone lines that run to almost every home. Such consumer videophones use proprietary algorithms which require that both parties to a video call have a videophone made by the same manufacturer in order to complete a point-to-point video call.

As such, the problems associated with the prior art videophones are summarized as: expense, poor video quality, low data bandwidth, inflexibility, and incompatibility. It would be desireable to have a consumer videoconferencing system that can provide full-motion, high resolution video at an affordable price, that is compatible with standard analog telephone lines, and that can use a consumer's home camcorder and television. Consequently, this invention is designed to surpass the prior art and meet the needs of today's consumer.

SUMMARY

The invention provides a home videoconferencing system that uses a television monitor for receiving and outputting incoming standard television video and audio signals. Standard television signals are the analog NTSC video signals and analog audio signals broadcast by television stations to television receivers. The system uses standard, analog telephone lines for receiving incoming standard telephone signals and sending outgoing standard telephone signals. The standard telephone signals are the carrier modulated signals that are commonly used by modems, such as the modem associated with a fax machine or a personal computer. The system uses a camcorder for generating outgoing television signals, i.e. a series of standard television video and audio signals.

The system uses a system controller, a video controller and an audio controller to couple outgoing system signals to a modem and to receive and couple incoming signals to the television receiver. The video controller is coupled to the camcorder and to the television receiver and receives the standard outgoing video signals from the camcorder. The video controller converts the standard outgoing video signals into compressed digital video signals. The video controller also receives compressed incoming digital video signals which are converted into standard incoming video signals for output to the television receiver. The video controller stores a number of compression and decompression programs in a memory device, one of which is selected by the user.

The audio controller, typically a digital signal processor, is also coupled to the camcorder and to the television receiver. The audio controller receives the standard outgoing audio signals from the camcorder and compressed incoming digital audio signals. The audio controller converts the standard outgoing audio signals into compressed digital audio signals and converts incoming compressed digital audio signals into standard television audio signals for audio output on said television receiver. The audio controller stores a number of compression and decompression programs in a memory device, one of which is selected by the user.

The system controller is coupled to the modem, to the video controller and to the audio controller. The system controller receives the outgoing compressed digital video signals and the outgoing compressed digital audio signals from the respective video and audio controllers and multiplexes the compressed outgoing digital video and outgoing digital audio signals into outgoing system digital signals. Likewise, the system controller receives incoming digital signals, demultiplexes the incoming system signals, couples the incoming compressed audio digital signals to the audio controller and couples the incoming compressed digital video signals to the video controller.

The modem is coupled to a standard, analog telephone line and to the system controller. The modem is under the control of the system controller and converts the outgoing system digital signals into outgoing standard telephone signals for transmission on the standard telephone lines. Likewise, the modem converts incoming standard telephone signals into incoming system digital signals.

The invention allows the implementation of a personal videoconferencing system using ordinary household appliances. The telephone, camcorder, and television, commonly found around most homes, are operated with the invention to provide video and audio transmission over ordinary analog telephone lines. The HVS allows full motion, high resolution video phone calls to be placed just as an ordinary phone call. The telephone, camcorder, and television can be used in their normal modes when video calls are not ongoing.

DETAILED DESCRIPTION

Figure 1:
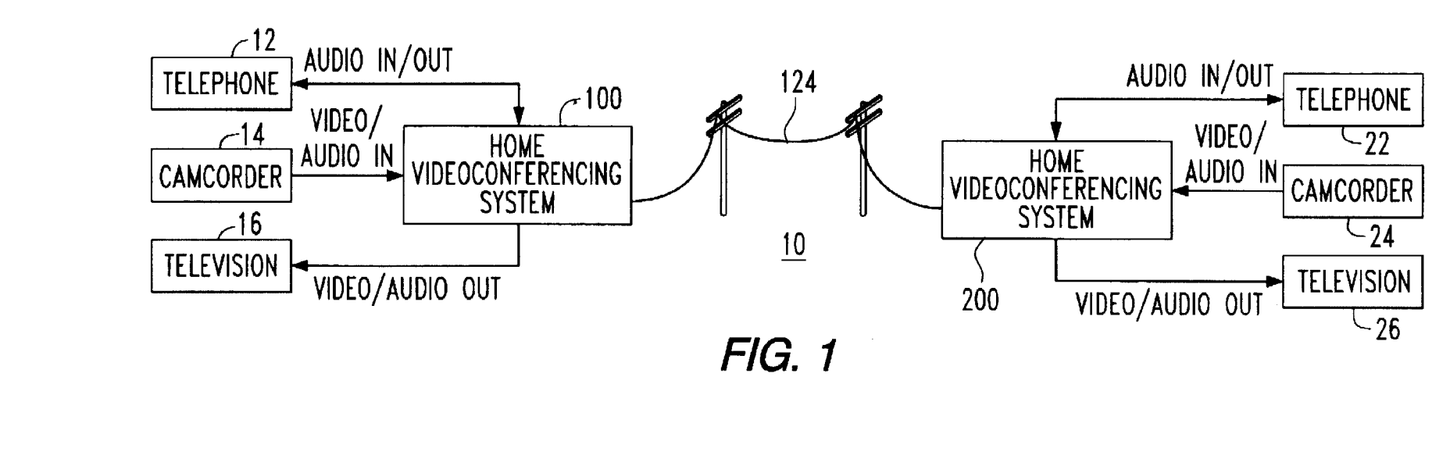
FIG. 1 is a scematic view of two HVS.

With reference to FIG. 1 there is generally shown a first home conferencing system 100 and second home conferencing system 200 connected together by ordinary telephone lines 124. First home conferencing system 100 includes a telephone 12 having an audio input and audio output, a camcorder 14 that generates standard television video and audio output signals, and a television receiver 16 which outputs standard television video and audio signals. The home conferencing system 100 receives outgoing video and audio signals from the camcorder 14. As explained hereinafter, the home conferencing system 100 has an auxiliary audio input so that the user may either provide an audio input through the camcorder or through a separate microphone such as telephone 12. This feature gives the user the opportunity to select a video transmission and then simultaneously talk over the video transmission. Home conferencing system 100 converts the outgoing signals into signals compatible with standard, analog telephone lines 124. The outgoing signals are received as incoming signals by a second home videoconferencing system 200. The incoming signals are converted into standard television video and audio signals for display upon the television receiver 26. The second home videoconferencing system 200 is also equipped with its own camcorder 24 and telephone 22 for providing outgoing video and audio signals to the first home conferencing system 100.

Figure 2:
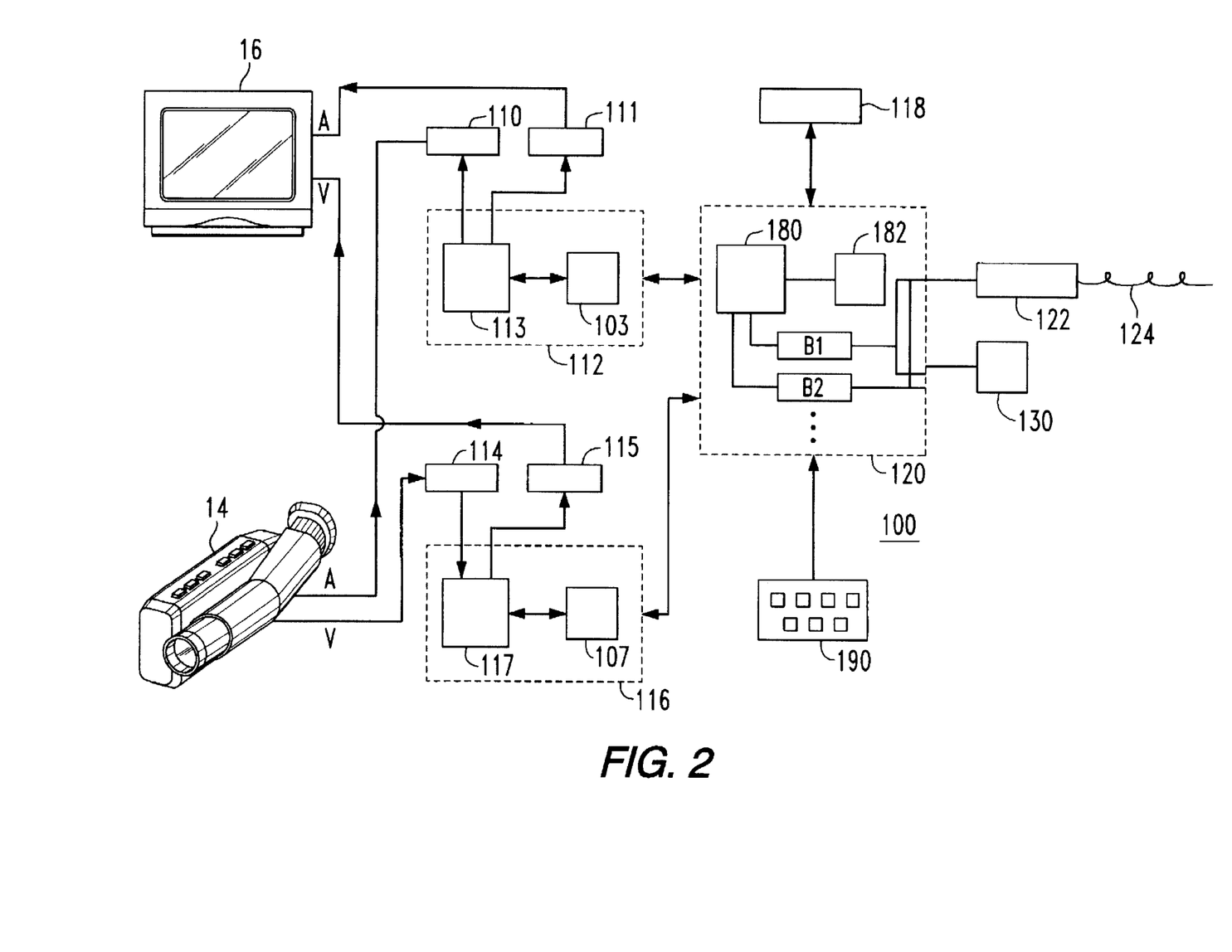
FIG. 2 is a block diagram of a HVS.

Turning to FIG. 2, the home conferencing system 100 is shown in greater detail. Those skilled in the art will appreciate that the home conferencing system 200 is identical to home conferencing system 100. The outgoing audio signal from camcorder 14 is coupled to an audio analog-to-digital converter 110. The output of the audio A-to-D 110 is coupled to the audio controller 112. An audio digital-to-analog converter 111 receives an input digital signal from audio controller 112 and outputs an audio analog signal to the television receiver 16. The video output of camcorder 14 is coupled to a video analog-to-digital converter 114. The output of video A-to-D 114 is coupled to the video controller 116. The video controller 116 is also coupled to a video digital-to-analog converter 115. The output of D-to-A converter 115 is coupled to the video input of the television receiver 16. Audio controller 112 and video controller 116 are both coupled to a system controller 120. The system controller 120 is also coupled to an error correction chip 118 and to a modem 122. Modem 122 has its output and input coupled to standard, analog telephone lines 124.

The audio controller 112 includes a digital signal processor (DSP) 113 and suitable memory devices 103 for volatile as well and nonvolatile storage of data and programs. In particular, audio compression and decompression algorithms are normally stored in nonvolatile memory such as electrical programmable read only memories or electrically erasable programmable read only memories. Data coming into or going out of the audio controller 112 may be stored in buffers or volatile memory such as dynamic random access memories. The nonvolatile memory of the audio controller 112 stores the compression and decompression programs. The compression program in memory 103 is accessed by the DSP 113 which compresses the digital signals received from A-to-D converter 110. Likewise, the DSP 113, operating under control of the decompression program stored in memory 103, will decompress incoming audio signals for transmission to the D-to-A converter 111.

Video controller 116 operates in a manner similar to the audio controller 112. The video processor 117 is coupled to volatile and nonvolatile memory 107. Compression and decompression programs are stored in the nonvolatile memory. Input digital signals from A-to-D converter 114 are compressed and output to system controller 120. Likewise, input compressed digital signals from system controller 120 are decompressed and output to D-to-A converter 115.

System controller 120 performs a number of operations on the compressed digital audio and digital video signals. System controller 120 multiplexes the audio and video signals together so that audio and digital signals are interspersed. Such multiplexing is efficient for communication purposes and also maintains the proper relationship between the audio and the digital signals. System controller 120 has a processor 180, a number of buffers B1, B2 . . . BN, nonvolatile memory and volatile memory. In accordance with a program stored in the nonvolatile memory, the processor 180 in the system controller 120 multiplexes outgoing signals and also demultiplexes incoming signals received from the modem 122. Likewise, under suitable software control, the system processor 120 frames the multiplexed signals into a communication frame that is compatible with transmission via lines 124 to the second home videoconferencing system 200. The system controller 120 synchronizes the transmission of data between the system 100 and the system 200. An error correction device, typically an integrated circuit 118 is coupled to the system controller 120. The error correction device provides one or more data bytes for each frame transmitted from the system controller 120. The error correction data bytes are used by the receiving system 200 to analyze the transmitted frames of data to determine if there are any errors in the transmission. Likewise, the error correction device 118 provides a suitable software program for the system controller 120 to analyze incoming data frames to determine if there are any errors in the data frames. If errors are detected, then suitable software subroutines provided by the error correction device 118 correct the received data transmission errors. A message unit 130 is coupled to the system controller 120 for providing a video messaging feature as explained hereinafter.

Figure 7:
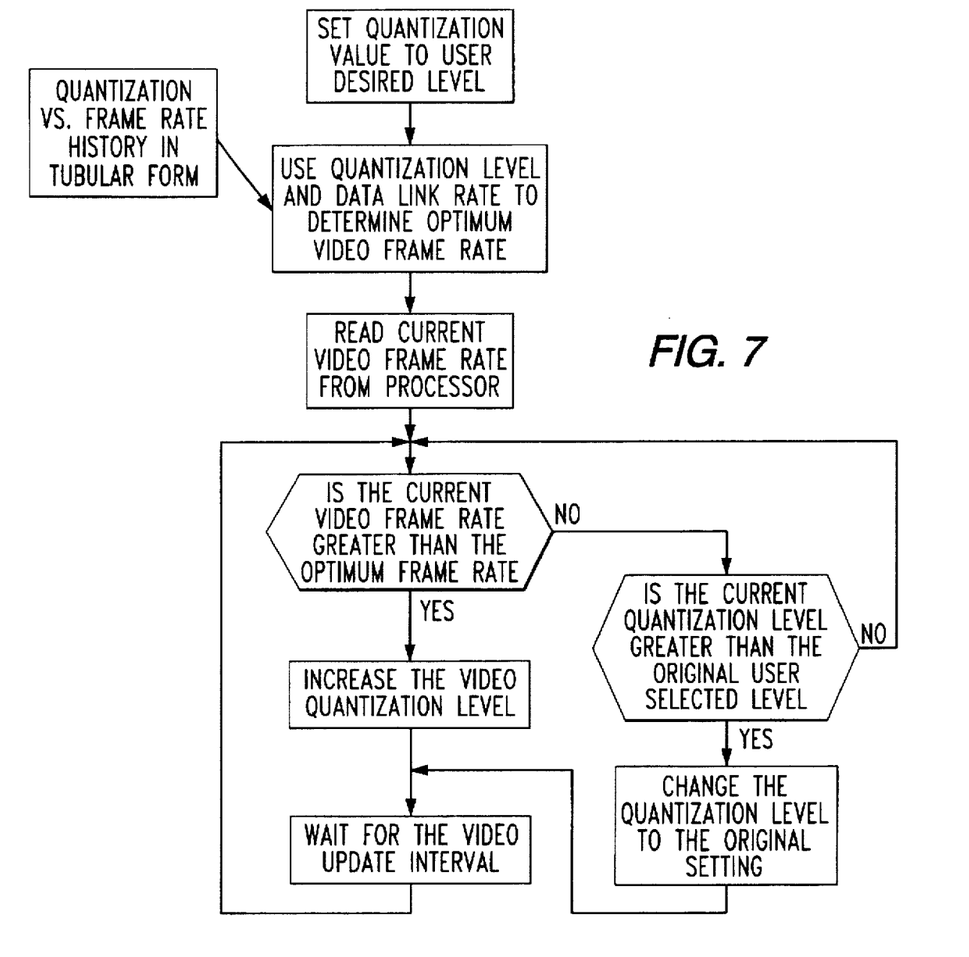
FIG. 7 is functional block diagram of the video resolution optimization program.

An operator input unit 190 allows a user to select and/or change one or more features of the system 10. The input unit 190 may be any suitable device for communicating commands to the system controller 120. In the first embodiment, the unit 190 is a key pad. However, it could also be a keyboard. By using unit 190, the user can download new compression/decompression algorithms from telephone lines 124 for storage into the respective video controller and audio controller memories 103, 107. Unit 190 also allows the user to select different levels of resolution. In particular, the user can set the quantization value as shown in FIG. 7. The amount of error correction, the data framing, and the particular multiplexing scheme are also adjustable by the user through unit 190. More specifically, the particular program or sequence of operations used to perform error correction, framing, and multiplexing is stored in one or more memory locations 103, 107, 182, and 118 or in processors 113, 117, 180. Each program can be accessed and changed through the unit 190 or with the unit 190 operating together with incoming signals over modem 122.

Modem 122 both receives and transmits digital data. In particular, the modem 122 receives compressed, multiplex framed data bits from the system controller 120 and converts those digital signals into tones, i.e. analog signals at frequencies compatible with transmission over ordinary, analog telephone lines 124. As such, the modem 122 will include a carrier modulation circuit for converting the digital signals into analog signals for lines 124.

The system 100 architecture allows for a flexible and inexpensive implementation since many of the major operations are essentially performed in software. As such upgrades or totally different algorithms can be downloaded (via phone lines) and used at any time. The re-configurable parts of this system are described in Table A.

TABLE A

| Parameter | Possible Values |
|---|---|
| Video Algorithm | JPEG, MPEG, H.261, QCTX, H.26P, Proprietary |
| Audio Algorithm | LPC 10, CELP, AV.25P, Proprietary |
| Error Correction | Reed Solomon with programmable level of FEC overhead data |
| Frame Structure | H.221, H.22P, Proprietary |

A HVS video call is initiated by the user of system 100 dialing the phone number of the user of system 200 with a standard telephone. The receiving system 200 is a compatible video system, so the modems 122, 222 synchronize at the highest data rate allowed by the analog phone line 124. This rate may be as high as 28.8 kbps for a good quality connection. Once the internal modems 122, 222 are in "sync", video and audio transmission begins in both directions.

The video of system 100 input is supplied by the camcorder 14 or any other standard NTSC video compatible equipment such as a VCR or TV tuner. Therefore, the user can transmit a live video image, via the camcorder, or play a recorded tape from the camcorder or VCR, or send a live broadcast TV signal. Similarly, the audio input can be from the telephone microphone or from any other device which produces line-level audio (camcorder, VCR, TV). The received video signal is displayed on a standard television receiver 26 or recorded with NTSC compatible video equipment. The received audio can be routed to the telephone 22 ear piece or through any other available speakers.

The video processor 117 in video controller 116 implements a variety of different video software. This enables the video controller 116 to be compatible with many systems. New programs, also know as algorithms, can be quickly downloaded over phone lines 124 at the user's discretion. The audio DSP 113 in audio controller 116 implements a variety of different audio algorithm software. This enables the audio controller 112 to be compatible with many systems and new algorithms can be quickly downloaded over phone lines 124 at the user's discretion. This modem 122 allows communication over analog phone lines 124 at very high bit rates. V.34 is the highest rate modem standard. Because the data framing by system controller 120 is performed in software, many different types of framing can be implemented. This allows customization to various user needs. The amount of error correction overhead by the error correction device 118 is adjustable and can be changed based on the needs of the communication channel.

Figure 3:
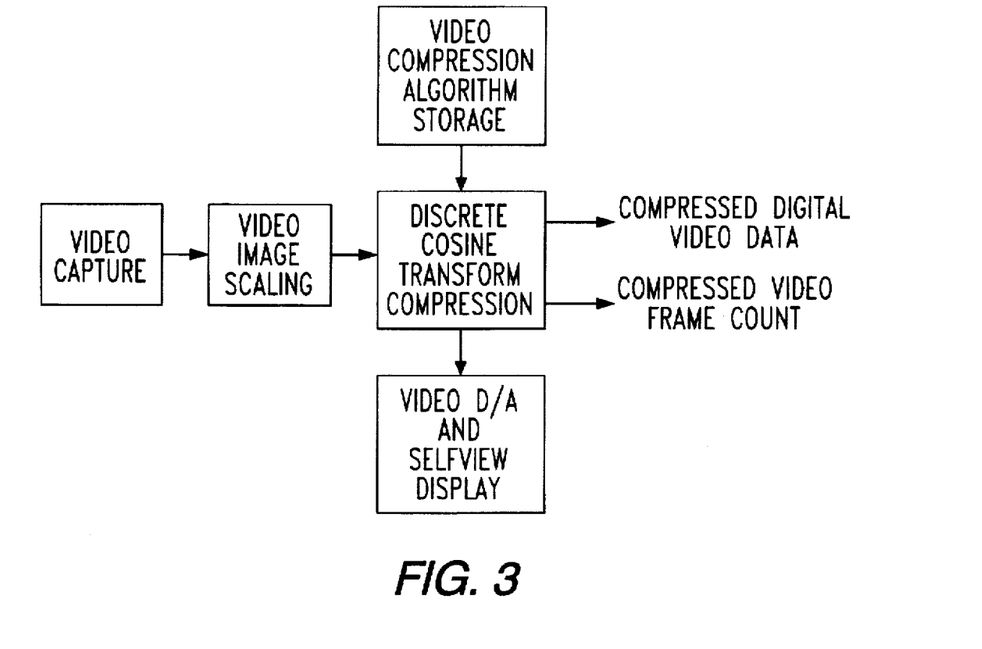
FIG. 3 is a functional block diagram of the video capture and compression steps.
Figure 4:
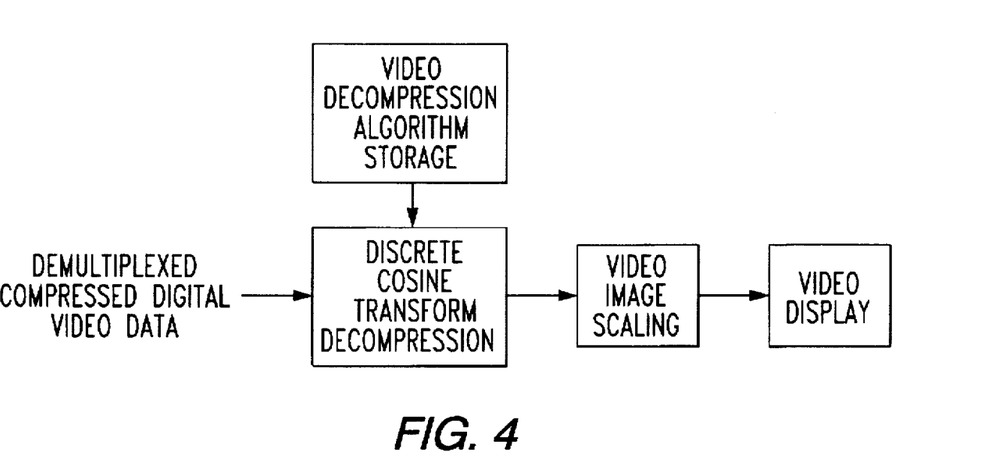
FIG. 4 is functional block diagram of the video demultiplexing, decompression and display steps.

The digital video compression and decompression is performed by a single-chip video processor 117 which implements a discrete cosine transform as described by the video algorithm software. The video software dictates the size of the video image, the resolution, and the given frame rate for a specific bandwidth. The user also has control over these parameters for any algorithm. As mentioned earlier, different video software algorithms can be used making the system very flexible. The video compression and decompression algorithms are stored in memory 107. If the user desires a new or upgraded algorithm, it can be downloaded via standard phone lines. The sequence of operations for video compression and video decompression are shown in FIGS. 3, 4, respectfully.

Both video compression and decompression occur simultaneously in real time. Additionally, the outgoing image can be displayed on the monitor as a picture-in-picture along with the incoming image.

One of the features of the invention is its ability to use standard components. For example, the video controller 116 is a programmable chip set supplied by Integrated Information Technology. However, the IIT chip set is designed to work on a standard personal computer platform with a general purpose microprocessor. The general purpose microprocessor runs an application program that communicates with the video processor and provides an interface to the disk drive controller. One of the features of the invention is the elimination of the hard disk drive.

The HVS system 100 has no general purpose microprocessor, disk drive controller, or hard disk drive.

Figure 5:
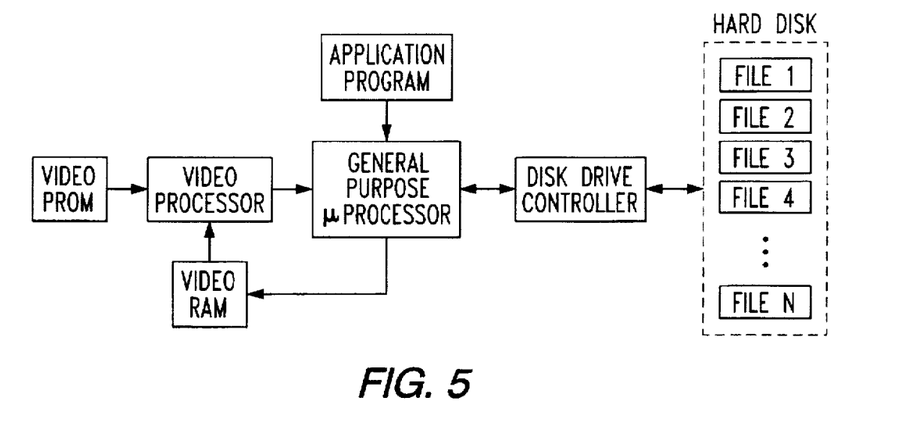
FIG. 5 is a block diagram of a video processor using a hard disk drive.

Instead, the HVS microcontroller 180 and embedded firmware emulate the hard disk interface used by the ITT video chip set and its associated application program. A functional block diagram of the ITT hardware design is shown in FIG. 5. As shown in FIG. 5, the video processor 117 issues commands for access to a hard disk drive. Files stored on the hard disk drive contain application programs executed by the processor 117. However, it would be costly and cumbersome to place a disk drive in a home videoconferencing unit. The requirement for a hard disk drive is one of the drawbacks of prior art system. On the other hand, it would be efficient use existing hardware such as the ITT processor.

Figure 6:
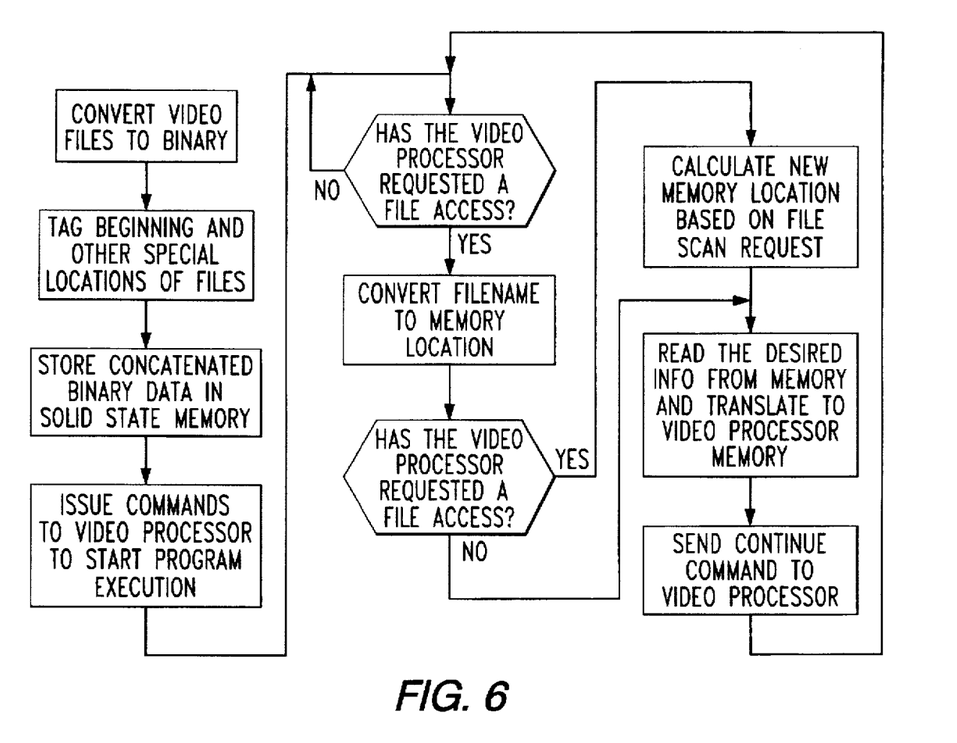
FIG. 6 is functional block diagram of a hard disk emulation program.

The invention solves the problem by eliminating the hard disk drive through the use of a hard disk emulation program. The emulation function and program is diagrammed in the flow chart given in FIG. 6. As shown therein, a program stored in the microcontroller 180 and its memory 182 converts the video filenames to binary and tags the locations of files, such as the compression and decompression algorithms. When the processor 117 requests a file from the hard disk, the program shown in FIG. 6 converts the filename given by the processor 117 into the memory location in memory 107 where the algorithm, normally stored on a hard disk, is now stored in a solid state memory device. As such, the hard disk file names normally associated with the ITT chip set can be used in the HVS 100 without modification of the ITT chip set.

One parameter associated with all discrete cosine transform algorithms is the video pixel quantization level. This level essentially determines the sharpness of the digitally compressed video image. A tradeoff is made by the user between image sharpness and video frame rate. As the sharpness increases, the frame rate decreases for a fixed communication link bandwidth. Since video compression algorithms only send the changes between video frames, a low amount of motion in the video image causes a reduction in the amount of data transmitted. The HVS system 100 takes advantage of this reduction in motion (and consequently video data) in order to increase the quantization level and sharpness of the image. Therefore, as the amount of motion decreases, the image sharpness increases. When there is more motion in the captured video image, the sharpness is automatically decreased back to the original level.

The video resolution optimization is accomplished independently from the video compression/decompression program execution and can be used with any motion program. This feature allows an improved video image but remains compatible with any chosen standard. A flow chart describing the resolution program is shown in FIG. 7.

The HVS system 100 also allows the user to implement a video answering machine. It works in a manner similar to a standard answering machine except that the outgoing and incoming messages add video. The user records an outgoing message using camcorder 14 (or another video input source) to supply the video component that accompanies the audio. Both the video and audio are digitized and stored in message unit 130. When the HVS answer feature is activated and a video call is received, the outgoing message is played to the caller. At the proper time, the caller can leave an incoming video message that is stored in digital memory for later playback.

Figure 8:
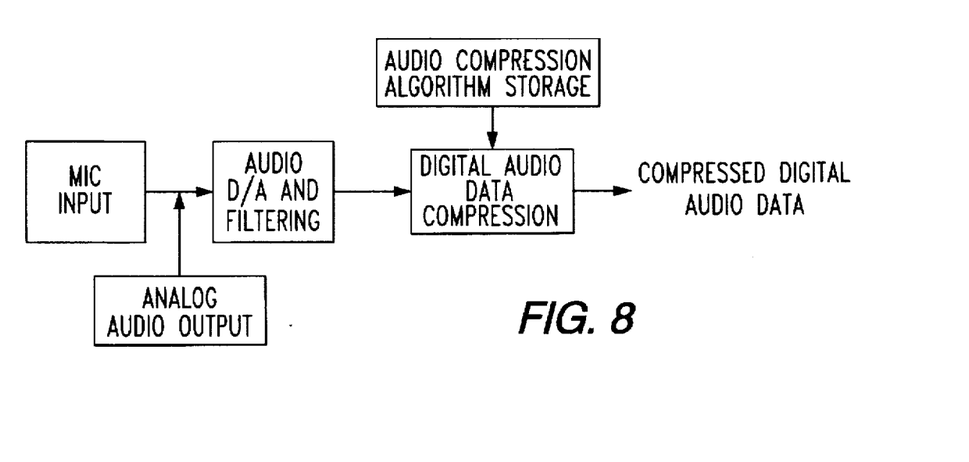
FIG. 8 is functional block diagram of the audio acquisition and compression steps.
Figure 9:
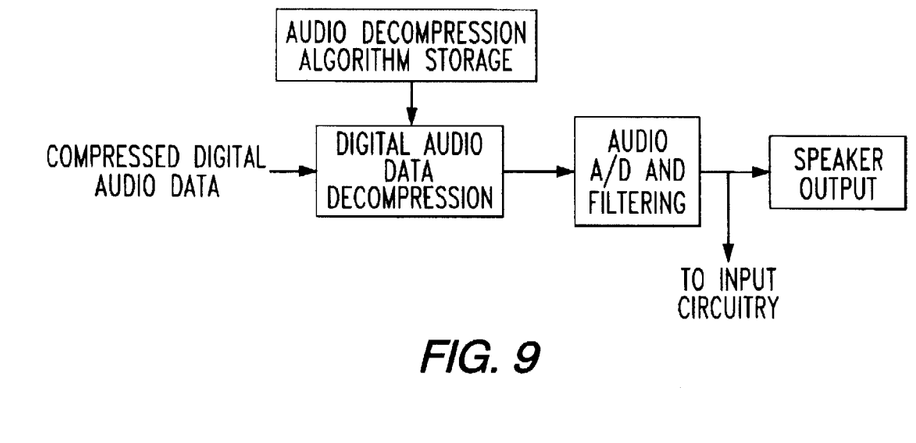
FIG. 9 is functional block diagram of the audio decompression and output steps.

With reference to FIG. 8, 9 the digital audio compression and decompression is performed by a digital signal processor 113 which is capable of implementing a variety of audio algorithms such as LPC 10, CELP, and VSELP. The algorithms are stored in memory 103. The audio algorithm determines the specific bit rate at which the audio data is provided. The ability to select multiple audio algorithms makes the system very flexible. When the user desires a new or upgraded algorithm, it can be downloaded via the phone lines. Both the audio compression and decompression occur simultaneously in real time. Echo suppression circuitry is included to prevent unwanted audio feedback.

Figure 10:
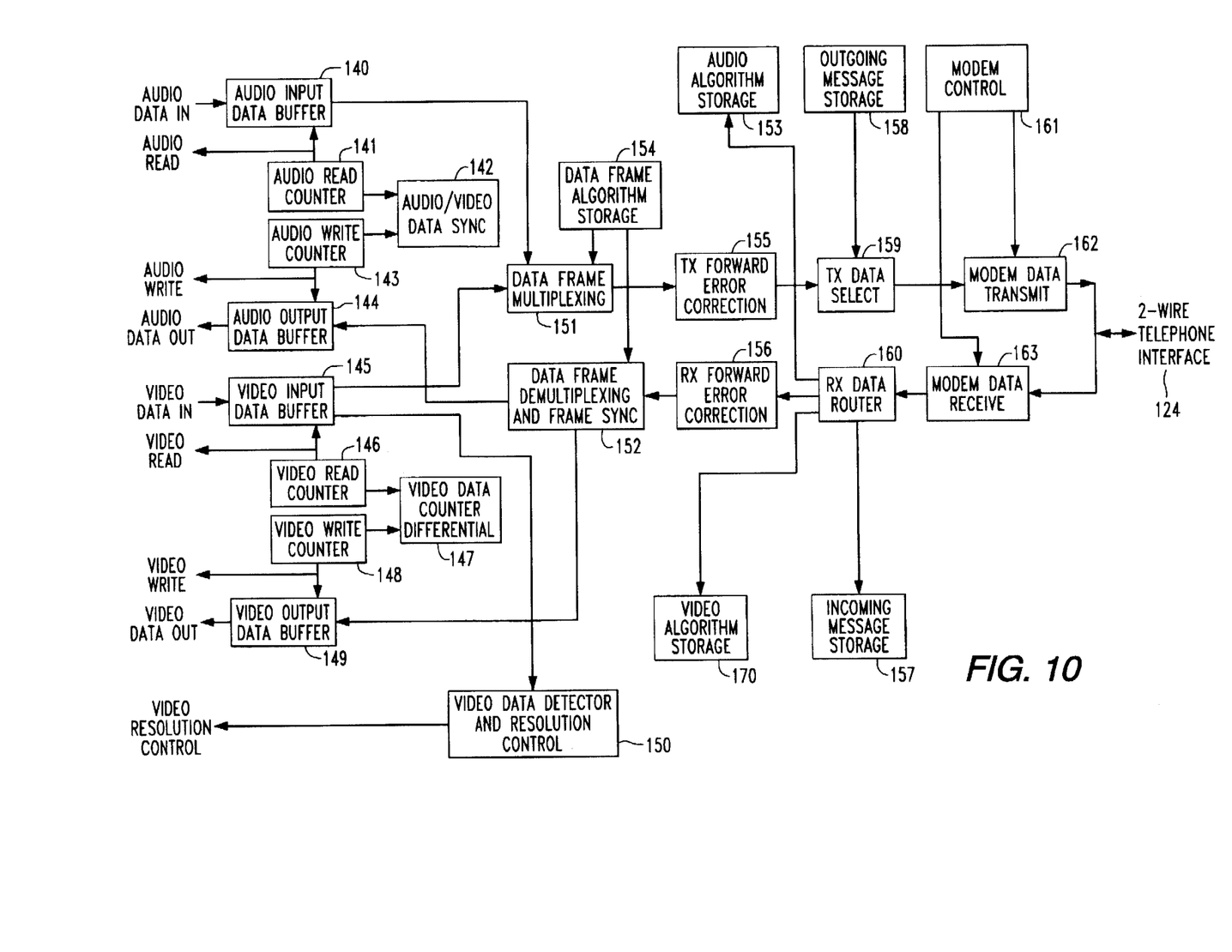
FIG. 10 is a combination functional and block diagram of the system controller.

Turning to FIG. 10, there is shown a block diagram for the system controller 120 that provides the operational sequencing for the entire system. The audio and video data going to/from the audio and video controllers 112, 116 are buffered and synchronized by controller 120. In the transmit path, the audio and video data is multiplexed together to form the appropriate data frame. Since the framing operation is performed in software, the frame structure may conform to a variety of standards if necessary. New standards can be downloaded by the user whenever desired. Once the data frame has been generated, forward error correction bytes are added to correct any data errors that may occur during transmission. The amount of forward error correction is programmable and can be changed to reflect the quality of the communication channel. The digital data is then converted to analog tones and transmitted over the standard phone lines.

In the receive path, the sequence is similar but occurs in the reverse order. Analog tones from the phone line 124 are converted to digital data by the modem 122 circuitry. Error correction is performed on the data in order to eliminate any errors that may have occurred. If the incoming data is a new video or audio algorithm, the bytes are routed to the appropriate memory locations. Otherwise, the data frame is demultiplexed into separate video and audio data streams and sent to the video and audio decompression circuitry.

One of the features of controller 120 is that the controller senses the speed of the data traveling over any particular two wire telephone connection 124. It is known that the data rates available on any particular telephone interface will vary from as high as 30 kbps per second to as low as 10 kbps per second. The system controller 120 uses the known data transmission speed in order to multiplex video and audio data. As such, in a given data frame, a portion of the bits of the data frame include compressed video data and a portion of the bits in the data frame included compressed audio data. The system controller 120 decides, based upon the particular data speed available by a given telephone connection, how much video data and audio data is put into a given data frame. In practice, the amount of audio data in a given frame is generally fixed and the amount of video data is allowed to vary in order to adjust the resolution of the transmitted video data. Accordingly, it is necessary to buffer incoming audio and video compressed data and then select bits of that compressed data from the video and audio buffers in order to form the transmitted, multiplex data frame.

Compressed audio data is input to an audio input data buffer 140 and compressed video data is input to a video input data buffer 145. An audio read counter 141 is coupled to an audio/video data sync module 142. The audio read counter 141 controls the amount of compressed audio data that is input to a data frame multiplexer 151. Likewise, a video read counter 146 and video data counter 147 control the amount of compressed video data that is input to the data frame multiplexer 151. After the data is framed and multiplexed it is passed through a transmission forward error correction circuit 155. From the error correction circuit 155 the data frame is passed to a data select buffer 159. The output from the data select buffer 159 is connected to the modem data transmit line 162 of the modem 122. The data frame multiplexer 151 is under the control of the data frame algorithm 154. The data frame algorithm 154 establishes the number of bits and the multiplexing of audio and video data within a given data frame. Also connected to the data select buffer 159 is an outgoing message storage source 158. The outgoing message source 158 can be selected for transmission via the modem data transmit line 162 of modem 130. The modem transmit line 162 and the modem data receive line 163 are controlled by a modem controller 161.

Incoming modem data is presented to a receiver data router 160. Receiver data router 160 either stores incoming modem data into an incoming message storage 157 or directs incoming information regarding an audio algorithm to an audio algorithm memory 153. Likewise, incoming information regarding a video algorithm is directed to video algorithm storage unit 170. It was mentioned earlier that one of the features of the invention is its ability to change the audio and video compression and decompression algorithms. The feature of routing the incoming video and audio compression/decompression algorithms to their respective storage location 153, 170 enhances the flexibility of the system controller 120.

Incoming data is input to a received forward error correction circuit 156 where errors are corrected. The corrected data is then input to a demultiplexer 152. Demultiplexer 152 separates the audio data from the video data. The audio data is routed to audio output buffer 144; video data is routed to video output buffer 149. Audio output buffer 144 is controlled by the audio write counter 143 and the audio video data sync 142. Depending upon the synchronization of the audio and the video in the data frame received in the demultiplexer 152, the audio is read out of the audio data buffer 142 and may be either written to memory or placed on the audio output line for output to the audio controller 112. In audio controller 112 the compressed audio data of the input frame is decompressed and then output to receiver 16 to a suitable speaker. In a similar matter, the decompressed video data frame information is written out of the video data buffer under control of the video write counter and the video data counter differential 147. The compressed video data information is decompressed by the video controller 116 for display on the television receiver 16.

Figure 11:
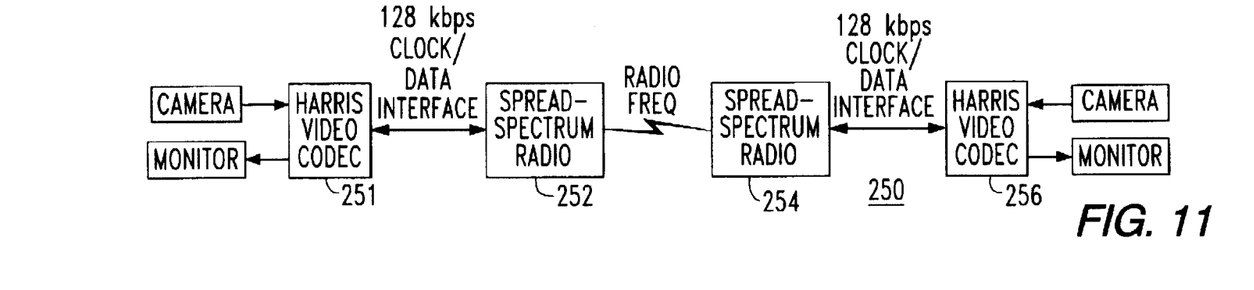
FIG. 11 is a functional block diagram of a second embodiment of the invention.

A second embodiment of the invention provides a video-only transmission unit 250 using commercially available spread-spectrum radios 252, 254. This device uses an off-the-shelf video codec boards 251, 256 configured as shown in FIG. 11. The unit 250 transmits a digitally compressed video at a data rate of 128 kbps over a distance of 5 miles. Only one video compression algorithm and one video resolution is with the unit.

Figure 12:
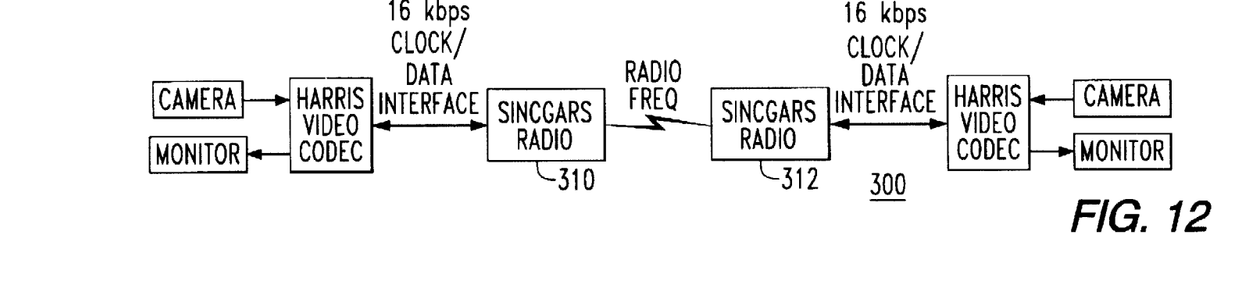
FIG. 12 is a functional block diagram of a third embodiment of the invention.

A third embodiment includes a unit 300 as shown in FIG. 12 unit 300 allows video communication via SINCGARS military radios. The SINCGARS radios 310, 312 are used by the military in a tactical field type of environment. The video algorithm and resolution were fixed in unit 300 and the unit 300 operates at a data rate of 16 kbps.

Figure 13:
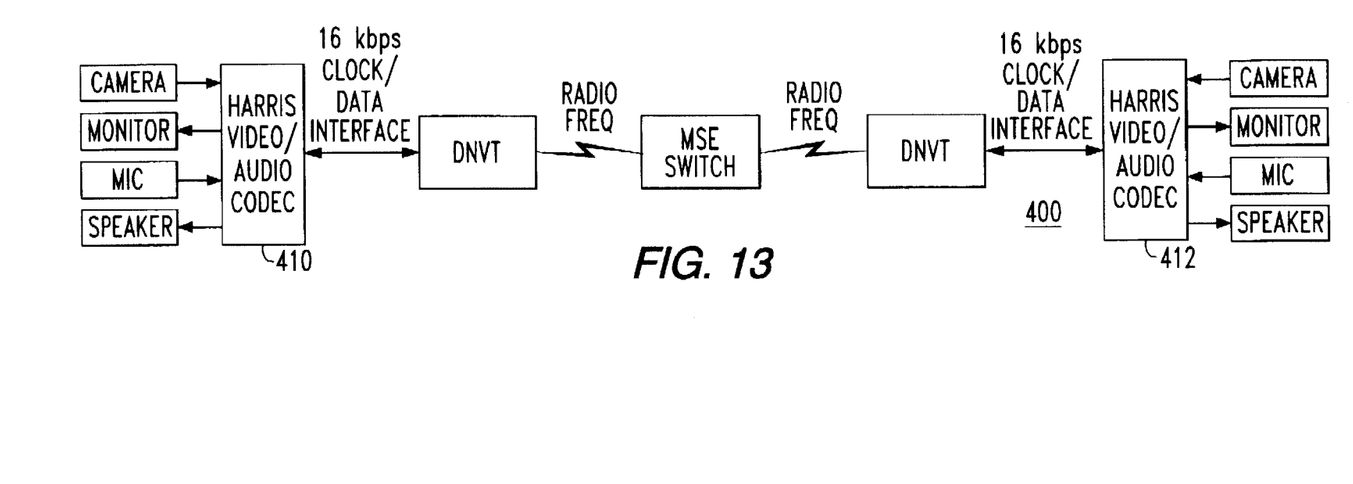
FIG. 13 is a functional block diagram of a fourth embodiment of the invention.

A fourth embodiment provides a conferencing system 400 for military applications and allows this user to send video and audio data over a field telecommunications equipment called MSE. The videoconferencing units 410, 412 coupled to a military device called a Digital Nonsecure Voice Telephone (DNVT) as shown in FIG. 13.

Figure 14:
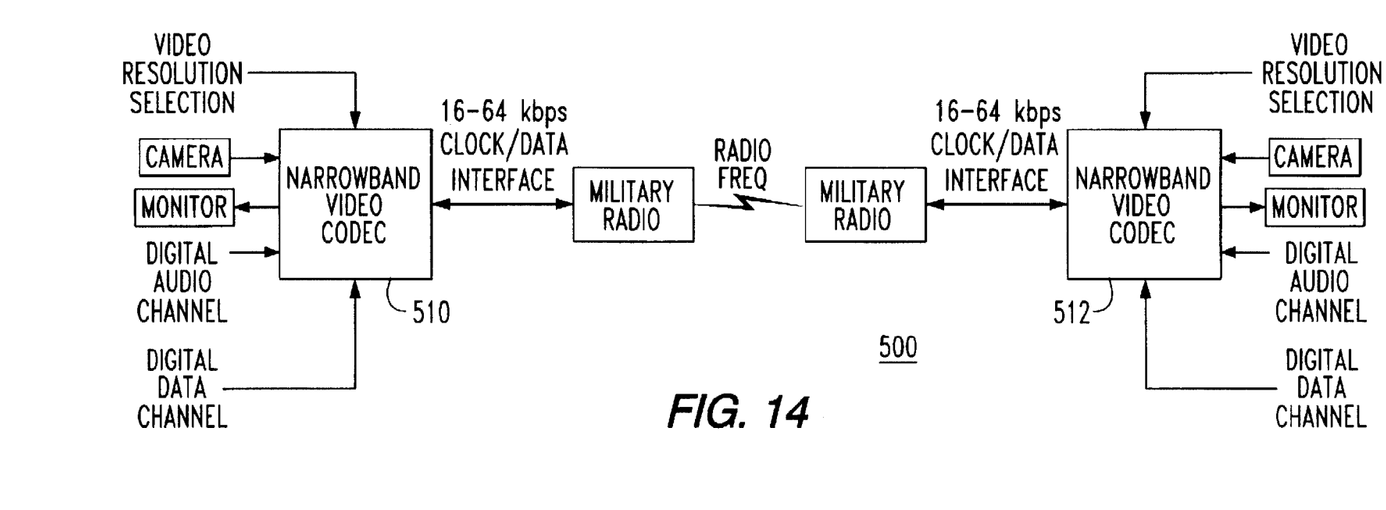
FIG. 14 is a functional block diagram of a fifth embodiment of the invention.

Another embodiment provides a system 500 having a variety of video algorithms to be implemented on a single hardware platform called the Narrowband Video Codes 510, 512. The codecs 510, 512 have improved video resolution and the ability to add audio and data channels to the bit stream. The design also included a programmable amount of Forward Error Correction overhead. The equipment interfaced to a variety of tactical military radios such as SINCGARS, MISTE II, LST-5, and others with a MIL STD 188-114 digital data interface. The system configuration is shown in FIG. 14.

Figure 15:
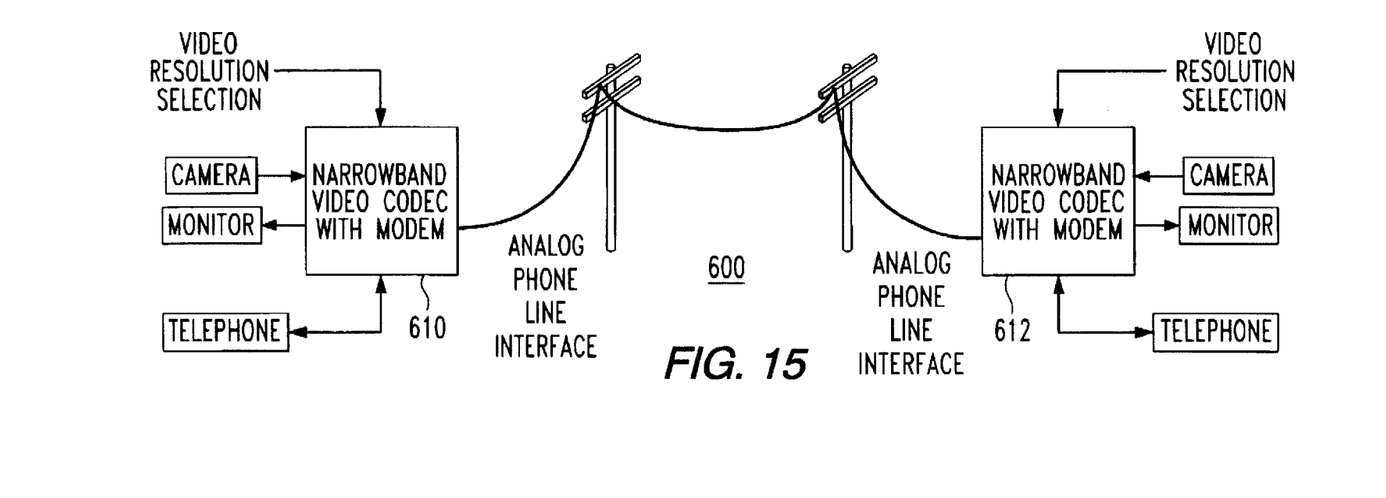
FIG. 15 is a functional block diagram of a sixth embodiment of the invention.

The Narrowband Video Code design (described above) can be modified to add a 28.8 kbps modem so that the modified codecs 610, 612 digital video could be transmitted over ordinary phone lines. This system 600 shown in FIG. 15 is especially useful by law enforcement organizations. The system 600 has multiple, user selectable video resolutions and could operate over link rates from 2.4 to 64 kbps.

Figure 16:
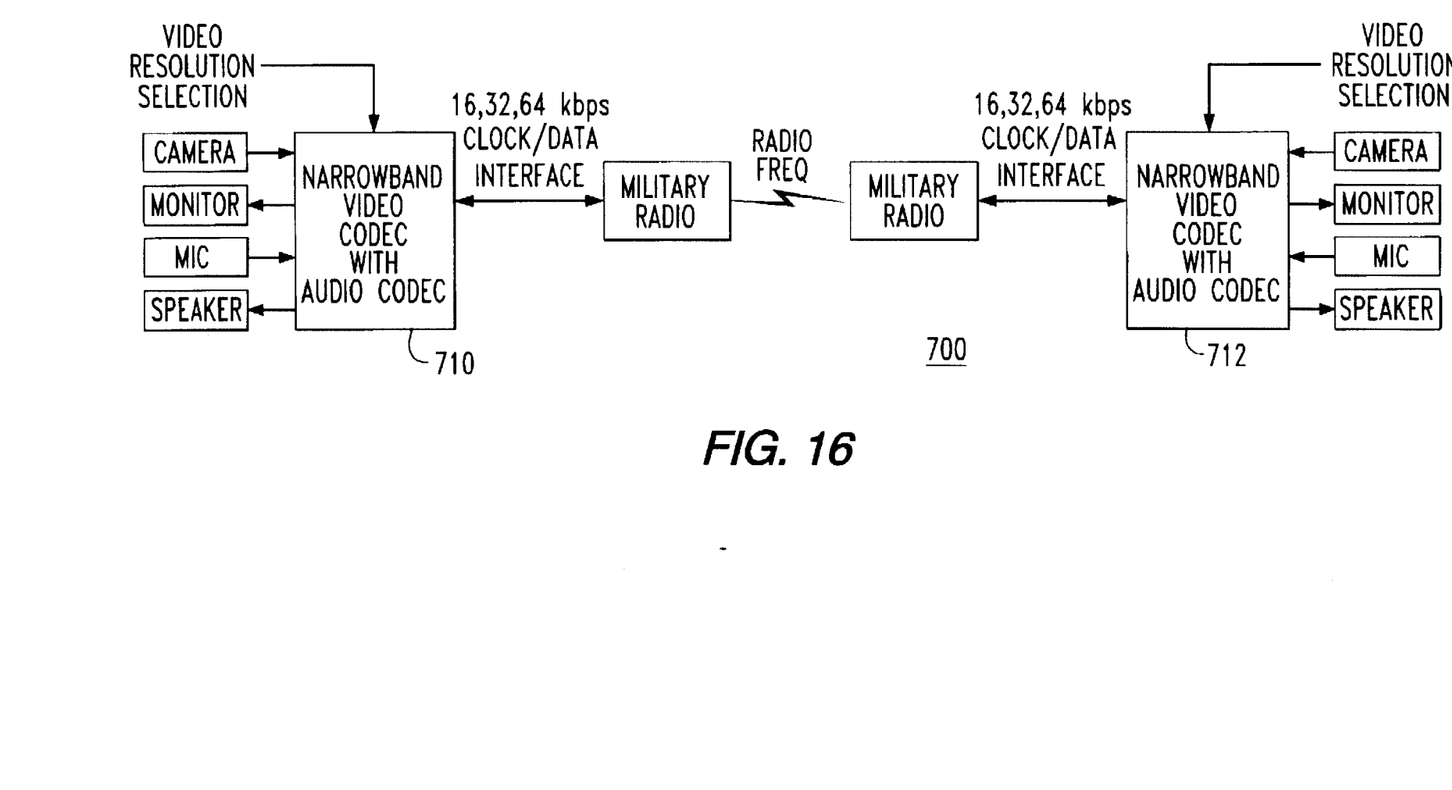
FIG. 16 is a functional block diagram of a seventh embodiment of the invention.

The Narrowband Video Code chassis 510 was further modified to include programmable, low bit-rate audio algorithms of 2.4 kbps LPC 10 and 4.8 kbps CELP and provide codecs 710, 712. The unit 700 operates at 16, 32, and 64 kbps with audio and the system configuration is shown in FIG. 16. The actual audio algorithm is automatically selected based on the communication link rate. The video, audio, and error correction/framing data rates are summarized in Table B.

TABLE B

| Comm Link Rate | Video Data Rate | Audio Data Rate | Error Correction Rate |
| --- | --- | --- | --- |
| 16 kbps | 12 kbps | 2.4 kbps | 1.6 kbps |
| 32 kbps | 24 kbps | 4.8 kbps | 3.2 kbps |
| 64 kbps | 52.8 kbps | 4.8 kbps | 6.4 kbps |
| 128 kbps | 110.4 kbps | 4.8 kbps | 12.8 kbps |

What I claim is:

1. A system for videoconferencing comprising:

a standard television monitor for receiving and outputting incoming television signals;

a standard telephone line for receiving incoming standard telephone signals and sending outgoing standard telephone signals;

a camcorder for generating outgoing television signals including a series of standard television video and audio signals;

a video controller coupled to the camcorder and to the television receiver for receiving standard outgoing video signals from the camcorder and for receiving compressed incoming digital video signals, for converting said standard outgoing video signals into compressed digital video signals, and for converting incoming compressed digital video signals into standard television video signals for video output on said television monitor, wherein the video controller comprises a processor having a memory for storing a plurality of compression and decompression programs for compressing the digital video signal received from the camcorder and for decompressing the digital video data for output to the television monitor and the video controller selects one of the plurality of compression and decompression programs;

a audio controller coupled to the camcorder and to the television receiver for receiving standard outgoing audio signals from the camcorder and for receiving compressed incoming digital audio signals, for convening said standard outgoing audio signals into compressed digital audio signals, and for converting incoming compressed digital audio signals into standard television audio signals for audio output on said television monitor;

a system controller for receiving the outgoing compressed digital video signals and the outgoing compressed digital audio signals of the video and audio controllers and for multiplexing the compressed outgoing digital video and outgoing digital audio signals into outgoing system digital signals and for demultiplexing incoming system digital signals into incoming compressed digital video signals and incoming compressed digital audio signals;

a modem coupled to a standard telephone line and to the system controller and under the control of the system controller for converting the outgoing system digital signals into outgoing standard telephone signals for transmission on the standard telephone lines and for converting incoming standard telephone signals into incoming system digital signals.

2. The system of claim 1 wherein the video controller issues file access commands for accessing files from a disk drive memory and the system controller comprises a program for converting the issued file access commands into memory locations in the system controller memory, thereby emulating the disk drive memory.

3. The system of claim 1 wherein the video controller performs a discrete cosine transformation on the digital video signals.

4. The system of claim 1 wherein the audio controller comprises a digital signal processor having a memory for storing a plurality of compression and decompression programs for compressing the digital audio signal received from the camcorder and for decompressing the digital audio data for output to the television monitor.

5. The system of claim 4 wherein the audio controller transforms the digital audio signals.

6. The system of claim 1 wherein the system controller arranges the multiplexed outgoing compressed digital video and audio signals into frames of data for output to the modem.

7. The system of claim 6 wherein the system controller synchronizes the respective transmission and reception of outgoing and incoming frames of data.

8. The system of claim 1 wherein the controller adds error correction data to the outgoing system digital signals.

9. A home videoconferencing unit comprising:

a video controller having an analog video input for receiving an outgoing analog video signal from a camcorder, an analog video output for providing a standard analog video signal to a television receiver, a digital video input for receiving compressed incoming digital video signal, said video controller converting said standard outgoing video signal into a compressed digital video signal, and converting an incoming compressed digital video signal into a standard television video signals for video output on a television monitor, wherein the video controller comprises processor having a memory for storing a plurality of compression and decompression programs for compressing the digital video signal received from the camcorder and for decompressing the digital video data for output to the television monitor and the video controller selects one of the plurality of compression and decompression program;

a audio controller having an analog audio input for receiving an outgoing analog audio signal from a microphone, an analog audio output for providing a standard analog audio signal to a speaker, a digital audio input for receiving a compressed incoming digital audio signal, said audio controller converting said standard outgoing audio signal into a compressed digital audio signal and converting an incoming compressed digital audio signal into a standard television audio signal for audio output on a speaker;

a system controller for receiving the outgoing compressed digital video signal and the outgoing compressed digital audio signal of the video and audio controllers and for multiplexing the compressed outgoing digital video and outgoing digital audio signals into outgoing system digital signal and for demultiplexing an incoming system digital signal into an incoming compressed digital video signal and an incoming compressed digital audio signal;

a modem coupled to a standard telephone line and to the system controller and under the control of the system controller for converting the outgoing system digital signal into outgoing standard telephone signals for transmission on the standard telephone lines and for converting the incoming standard telephone signal into incoming system digital signals.

10. The system of claim 9 wherein the controller adds error correction data to the outgoing system digital signals.

11. The system of claim 9 wherein the video controller issues file access commands for accessing files from a disk drive memory and the system controller comprises a program for converting the issued file access commands into memory locations in the system controller memory, thereby emulating the disk drive memory.

12. The system of claim 9 wherein the video controller performs a discrete cosine transformation on the digital video signals.

13. The system of claim 10 wherein the audio controller comprises a digital signal processor having a memory for storing a plurality of compression and decompression programs for compressing the digital audio signal received from the camcorder and for decompressing the digital audio data for output to the television monitor.

14. The system of claim 13 wherein the audio controller transforms the digital audio signals.

15. The system of claim 9 wherein the system controller arranges the multiplexed outgoing compressed digital video and audio signals into frames of data for output to the modem.

16. The system of claim 15 wherein the system controller synchronizes the respective transmission and reception of outgoing and incoming frames of data.

17. A method of home video conferencing comprising the steps of:

receiving and outputting incoming television signals on a television monitor;

receiving incoming standard telephone signals and sending outgoing standard telephone signals over standard telephone lines;

generating outgoing television signals including a series of standard television video and audio signals;

converting said standard outgoing video signals into compressed digital video signals and converting incoming compressed digital video signals into standard television video signals for video output on said television monitor;

converting said standard outgoing audio signals into compressed digital audio signals and converting incoming compressed digital audio signals into standard television audio signals for audio output on said television monitor;

multiplexing the compressed outgoing digital video and outgoing digital audio signals into outgoing system digital signals and demultiplexing incoming system digital signals into incoming compressed digital video signals and incoming compressed digital audio signals;

convening the outgoing system digital signals into outgoing standard telephone signals for transmission on the standard telephone lines and convening incoming standard telephone signals into incoming system digital signals; and storing a plurality of video compression and decompression programs, compressing the digital video signal received from the camcorder in accordance with one of said video compression programs and decompressing the digital video data in accordance with one of said stored video decompression programs in order to provide an output to the television monitor.

18. The method of claim 17 further comprising the steps of arranging multiplex outgoing digital video and audio signals into outgoing frames of data.

19. The method of claim 18 comprising the further step of synchronizing the respective transmission and reception of outgoing and incoming frames of data.

20. The method of claim 17 further comprising the step of correcting errors in outgoing and incoming frames of data.

21. The method of claim 17 further comprising the step of performing a discrete cosine transformation on the digital video signals.

22. The method of claim 17 further comprising the steps of storing a plurality of audio compression and decompression programs, compressing the digital audio signal received from the camcorder in accordance with one of said stored audio compression programs and decompressing the digital audio data in accordance with one of said stored audio decompression program in order to output audio to a speaker.

23. The method of claim 22 further comprising the step of transforming the digital audio signals.

24. The method of claim 17 further comprising the steps of issuing file access commands for accessing files from a disk drive memory and converting the issued file access commands into memory locations in the system controller memory, thereby emulating the disk drive memory.

* * * * *